United States Patent [19]

Massey et al.

[11] 4,052,646
[45] Oct. 4, 1977

[54] SPEED CONTROL SYSTEM FOR A CORRUGATOR

[75] Inventors: William A. Massey, Mount Holly; Donald J. Evans, Cherry Hill, both of N.J.

[73] Assignee: Molins Machine Company, Inc., Cherry Hill, N.J.

[21] Appl. No.: 660,891

[22] Filed: Feb. 24, 1976

[51] Int. Cl.$^2$ .............................................. H02P 5/46
[52] U.S. Cl. ........................................ 318/39; 318/78; 318/341; 318/603
[58] Field of Search ................... 318/341, 305, 78, 85, 318/39, 603

[56] References Cited
U.S. PATENT DOCUMENTS

| 3,373,329 | 3/1968 | Kaiser | 318/341 X |
|---|---|---|---|
| 3,566,230 | 2/1971 | MacMullan | 318/341 |
| 3,659,169 | 4/1972 | Waddicor | 318/341 |
| 3,753,066 | 8/1973 | Sailer | 318/305 |
| 3,764,868 | 10/1973 | O'Callaghan | 318/78 |

Primary Examiner—B. Dobeck
Attorney, Agent, or Firm—Seidel, Gonda & Goldhammer

[57] ABSTRACT

The separate motors of the single facer and double facer machines of a corrugator are controlled in response to separate digital set point signals. Each set point signal is generated by a counter in response to a pulse generator. In a RUN mode, the counter automatically generates a preselected set point signal indicative of a preselected minimum speed and the motor speed is brought up to the preselected minimum speed. The pulse generator and counter are free-running until a digital detector senses the preselected set point signal and inhibits the pulse generator. In FAST and SLOW modes, the pulse generator is selectively steered by the operator to cause the counter to generate selective set point signals indicative of selective set point speeds and the motor speed is varied to the set point speeds. In SET, SPLICE HOLD and SLOW HOLD modes, the set point signal is automatically varied to indicate either an adjustable reference speed set by thumb wheel switches or preset reference speeds set by internal preset switches. The motor speed is varied to the appropriate reference speed. In these modes, the pulse generator is steered by a digital comparator which inhibits the pulse generator when the set point signal indicates either the adjustable or preset reference speeds. At the initiation of the SPLICE HOLD and SLOW HOLD modes, a temporary storage circuit stores the value of the set point signal. In a RESUME mode, the stored signal is transmitted to the digital comparator and the motor speed is restored to the stored value. In a SYNC mode, the single facer motor is controlled in synchronism with the double facer motor.

16 Claims, 13 Drawing Figures

FIG. 5A GATING/CONTROL

FIG. 5B
GATING/CONTROL

FIG. 5C
GATING/CONTROL

FIG. 5D
GATING/CONTROL

FIG. 5E
GATING/CONTROL

FIG. 5F
GATING/CONTROL

FIG. 6
UP/DOWN COUNTER AND DETECTOR

FIG. 7 COMPARATOR

FIG. 8 TEMPORARY STORAGE CIRCUIT

SPEED CONTROL SYSTEM FOR A CORRUGATOR

BACKGROUND OF THE INVENTION

The present invention relates to a system for controlling the speed of a motor. In particular, the invention relates to a system for digitally controlling the speed of single facer and double facer motors in a corrugator. The motor speed can be automatically brought up to a preselected minimum speed or selectively varied from any speed above the preselected minimum speed to a desired speed including an adjustable or a preset reference speed. The single facer motor speed can by synchronously controlled to follow the speed of the double facer motor.

In a corrugator for producing paperboard, liner is fed to a single facer machine. A corrugating medium is also fed to the single facer machine. In the single facer machine, the corrugating medium is adhesively bonded to the liner to form a single faced web.

The single faced web is fed by a conveyor to the upper level of a bridge. An identical single facer machine produces a second single faced web which is transported by a second conveyor to the lower level of the bridge.

Each single faced web exits from the bridge along a bridge guide. The bridge guide feeds both single faced webs through a preheater and glue machine to a double facer machine. The glue machine applies an adhesive bonding agent to the crests of the flutes on the single faced webs. The webs are bonded to each other with the lower web also being bonded to a third liner fed to the double facer machine. the double facer machine maintains the single faced webs in contact with each other with one web in contact with the third liner while subjecting these components to controlled heat to gelatinize a starch solution used as an adhesive bonding agent.

The lay-out of a corrugator combining the above components is described in detail in application Ser. No. 369,632 entitled "Corrugator" filed June 13, 1973 incorporated herein by reference, now U.S. Pat. No. 3,977,929.

Each single facer and double facer machine has a separate motor drive, motor tachometer and voltage comparator. A speed control system in the form of a motor operated potentiometer mechanically slaved to a reversible motor supervised by a control panel is associated with each single facer and double facer machine. Each motor operated potentiometer controls the speed of the associated machine motor by providing a set point speed signal indicative of the speed to which the machine motor is to be driven. The set point signal is fed to the voltage comparator. The tachometer senses the actual motor speed and feeds a signal indicative thereof to the voltage comparator. The voltage comparator compares the set point signal to the tachometer feedback signal and generates an error signal for controlling the motor drive. The motor drive adjusts the motor speed to null out the error signal.

The single facer machine can be driven synchronously with the double facer machine as described in application Ser. No. 369,632. In synchronous operation, the double facer motor operated potentiometer is electrically coupled to the single facer voltage comparator. The single facer motor operated potentiometer is disconnected from the single facer voltage comparator. The set point signal from the double facer motor operated potentiometer is compared by the voltage comparator to the tachometer feedback signal from the single facer tachometer to produce an error signal for regulating the single facer motor speed in synchronism with the double facer motor speed.

The liner and the corrugating medium fed into the single facer machines are drawn from twin tension driven rolls mounted on separate mill roll stands. For example, there are two rolls of liner mounted on a mill roll stand for use in one of the single facer machines. When one roll of liner is being run into the single facer machine, the other roll is idle. When the running roll approaches depletion, the leading edge of the idle roll is spliced to the running liner entering the single facer machine. Liner from the idle roll is then drawn by tension to the single facer machine. The liner from the running roll is cut to complete the splice.

During the splice, the single facer motor speed should be reduced to reduce the tension on the idle roll. If the motor speed is not reduced, the tension can cause the splice to break. Typically, the speed of the liner entering a single facer machine is reduced to approximately 200 feet per minute. After the splice has been effected, the motor speed can be restored to the operating speed at the initiation of the splice. This should be done gradually to allow the idle roll to come up to speed without breaking the splice.

Heretofore, to reduce the motor speed to permit the splice to be effected and then restore the motor speed to the operating speed prior to splice, it was necessary to employ a separate preset potentiometer in addition to the motor operated potentiometer. The present potentiometer furnished the set point signal for reducing the motor speed during the splice. The speed control system was limited in that the motor operated potentiometer had to be disconnected while the motor was driven in response to the preset potentiometer. To restore the motor speed it was necessary to reconnect the motor operated potentiometer and disconnect the preset potentiometer.

The use of multiple potentiometers increases the system costs. In addition, changes in the set point signals on reducing and resuming speed are abrupt. An abrupt increase in speed could break a splice. Still further equipment must be provided in the motor drive to slow down the rate of change of the set point signals to prevent the splice from breaking.

Use of a motor operated potentiometer to vary the motor speed is limiting in several other respects. Elaborate relay controls are required to command the reversible potentiometer motor to mechanically adjust the potentiometer arm setting. The relay controls are costly and relatively unreliable. The use of motor operated potentiometers also limits the resolution of the system. In addition, the speed control system using motor operated potentiometers is not compatible with state of the art computer controls for a corrugator.

BRIEF SUMMARY OF THE INVENTION

A speed control system for driving a motor in response to a digital set point signal, comprising means for automatically bringing the motor up to a preselected minimum speed, means for selectively varying the speed of the motor between selective speeds, means for automatically varying the motor speed from an operating speed to either an adjustable or preset reference speed, means for storing a set point signal indicative of the operating speed, and means for restoring said motor speed to said operating speed in response to the stored set point signal.

The system may further include means for varying the speed of the motor in synchronism with the speed of another motor.

An advantage of the present invention is that the set point signal can be digitally controlled without mechanically operated control elements.

Another advantage of the invention is that the system is relatively inexpensive and highly reliable.

Another advantage is that the motor speed can be controlled with relatively high resolution.

A further advantage is that the motor speed can be automatically varied to an adjustable or a preset reference speed and automatically restored to a prior speed.

A still further advantage is that the motor speed can be instantaneously displayed.

Other advantages of the invention appear hereinafter.

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figures 1, 2:
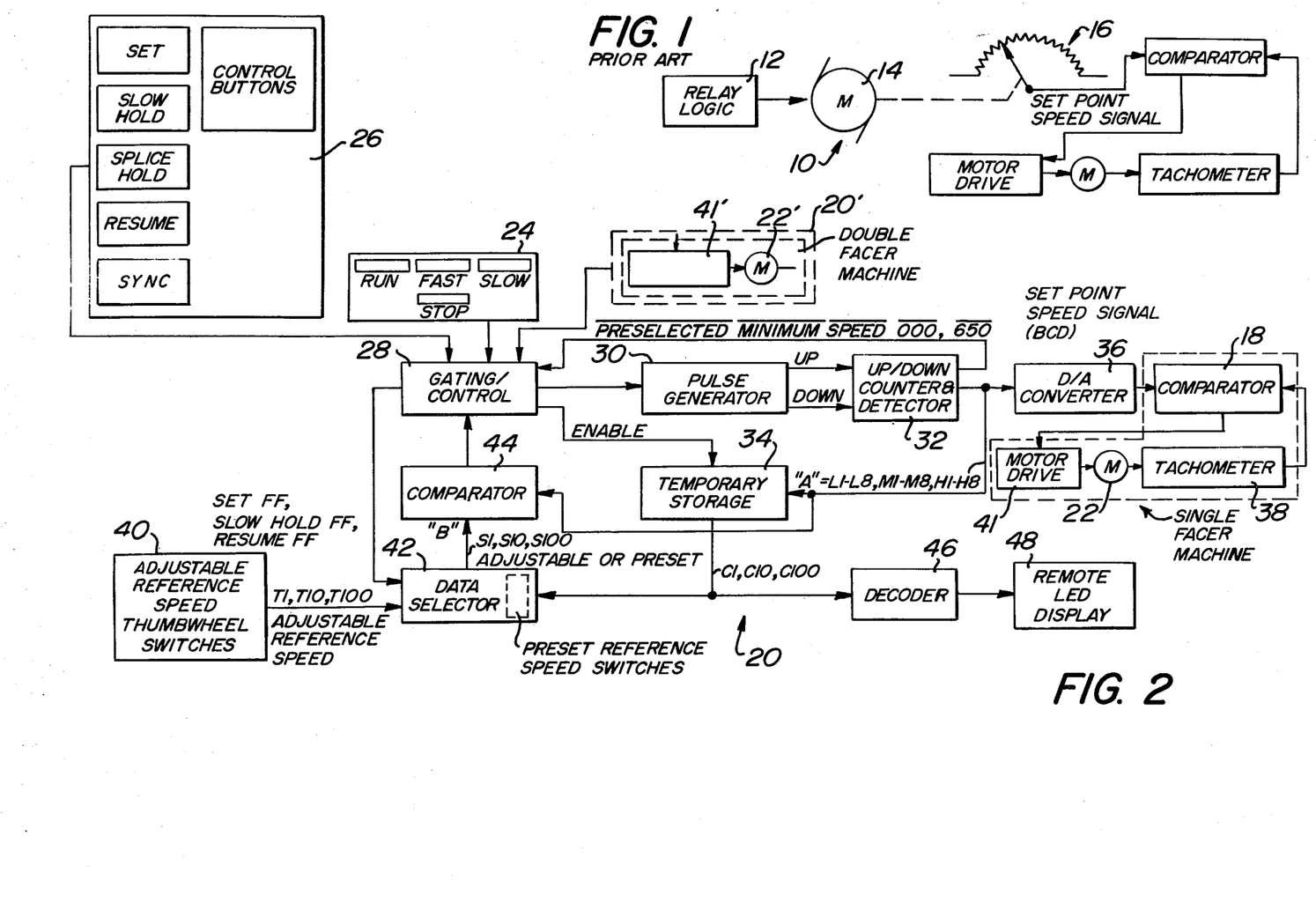
FIG. 1 is a block diagram of a speed control system known in the prior art.
FIG. 2 is a block diagram of the present invention.

Referring to the drawings in detail, wherein like numerals indicate like elements, there is shown in FIG. 1 a prior art speed control system for use in a corrugator, designated generally as 10. A set of relay controls 12 is manipulated by an operator to vary the speed of a reversible motor 14. The reversible motor is mechanically coupled to the arm of a potentiometer 16. The potentiometer arm is electrically coupled to a comparator which acuates the motor drive for a single facer or double facer motor in the corrugator. The actual speed of the motor is sensed by a tachometer and fed back to the comparator. The comparator compares the tachometer feedback signal to the set point speed signal from potentiometer 16.

In FIG. 2, there is shown a block diagram of a digital speed control system in accordance with the present invention, designated generally as 20. The system is less costly and provides higher reliability and finer control than the prior art system. System 20 provides the ability to preset and store set point speeds which can be recalled at the touch of a button.

System 20 is used to control the speed of a motor 22 which may be the single facer or double facer motor in a corrugator. If motor 22 is the single facer motor, system 20 can be operated in synchronism with an identical control system 20' (shown in phantom) used for controlling the speed of a second motor which would be the double facer motor in the corrugator.

When operated independently of system 20', system 20 is responsive to the pushbutton controls on control panels 24 and 26. The heart of the system 20 is gating/control 28 which processes the commands from operator control panels 24 and 26. Gating/control 28 comprises a group of random logic circuits for controlling the operation of pulse generator 30. In response to the commands from gating/control circuit 28, pulse generator 30 generates a digital pulse train on either the Up line or Down line to Up/Down Counter and Detector 32. Up/Down Counter and Detector 32 counts the number of pulses in the pulse trains on the Up and Down lines. The state of the Up/Down Counter represents the set point speed to which motor 22 is to be driven. D/A converter 36 converts the digital output of Up/Down Counter to an analog signal repressenting the set point speed. Tachometer 38 generates a feedback signal indicative of the actual speed of motor 22. Comparator 18 compares the analog output of D/A converter 36 to the feedback signal from tachometer 38 and operates motor drive 41 to null out the difference between the set point and feedback signals. The present invention is not directed per se to the configuration of comparator 18, motor drive 41, motor 22 and tachometer 38.

The speed of motor 22 can be adjusted to any predetermined reference speed by means of adjustable reference speed thumb wheel switches 40 and data selector 42. The speed of the motor can also be varied to a preset reference speed by means of the data selector and preset reference speed switches (shown in phantom in FIG. 2) contained therein. The preset reference speed switches determine at least two predetermined reference speeds to which motor 22 can be driven.

Thumb wheel switches 40 can be manipulated by the operator to vary the set point signal at the up/down counter output to indicate any predetermined reference speed. Alternatively, the set point signal at the up/down counter output may indicate a preset or fixed reference speed corresponding to the preset reference speed switches. Data selector 42 selectively transmits either the adjustable reference speed signal at the thumb wheel switches output or the preset reference speed signal at the preset reference speed switch output to comparator 44. Comparator 44 compares the output of data selector 42 to the set point signal at the output of the up/down counter. A difference between the input signals to the comparator is detected by the comparator which steers pulse generator 30, through gating/control 28, to null out the difference by bringing the output of the up/down counter into coincidencde with the output of the data selector. A change in state in the up/down counter is reflected at the output of D/A converter 36. The D/A converter commands comparator 18 and motor drive 41 to adjust the speed of motor 22 to the predetermined reference speed.

It is preferred that D/A converter 36 be an Analog Devices 12QZ1 BCD converter. The converter output varies between 0 and 10 volts corresponding to zero and maximum speeds of motor 22. The maximum speed for a single facer motor corresponds to a web speed of approximately 650 feet per minute. The up/down counter set point output to the D/A converter is a 12 bit BCD work changing between 000 and 650. The BCD output 000 corresponds to zero motor speed. The BCD output 650 corresponds to the maximum motor speed.

The instantaneous set point speed to which motor 22 is being driven is represented by the BCD output of the up/down counter. Normally, remote LED display 48 tracks the state of the up/down counter. Thus, the up/down counter output is fed to temporary storage circuit 34 which transfers the information to decoder 46. Decoder 46 may be a TI 4776A BCD-to-seven segment decoder/driver. The decoder drives remote LED display 48 which provides a digital indicator of the set point speed. Remote LED display 48 may be an IEE seven segment display.

Remote LED display 48 does not track the up/down counter output when the preset reference speed switches internal to the data selector are used. When the preset reference speed switches are used, gating/control 28 produces an Enable signal which causes temporary storage circuit 34 to store the output of the up/down counter immediately before the motor 22 begins to change speed to reach the preset reference speed. Thereafter, the output of the up/down counter will vary to indicate the changing set point speed, but the remote LED display 48 will only indicate the set point speed stored in temporary storage circuit 34.

In a corrugator, the preset reference speed set by the data selector switches is usually the speed at which the single facer motor is to be driven during a splicing operation. This may correspond to a liner speed of about 200 feet per minute for the single facer machine. The preset reference speed may, however, be more or less depending upon the reason for using the speed. For instance, it may be desired to reduce the speed of the single facer motor even further to permit the operator to adjust certain portions of the corrugator, such as the dam at the single facer machine, without having to shut off the corrugator.

It should be appreciated that the output of D/A converter 36 is a graduated ramp voltage. This permits gradual adjustment of the motor speed. The slope of the ramp is determined by the pulse repetition frequency of the pulse train produced by pulse generator 30. The greater the frequency the greater the slope of the ramp.

System 20 provides a high resolution speed control. The system entirely replaces the motor operated potentiometer, reversible motor and associated controls in the prior art system shown in FIG. 1. The system avoids any mechanical parts which may wear out such as the motor operated potentiometer arm.

There are nine possible operating modes for the system: RUN, FAST, SLOW, STOP, SET, SPLICE HOLD, SLOW HOLD, RESUME and SYNC. The FAST and SLOW modes are semi-automatic to the extent that they require the operator to initiate the terminate the mode. The remaining modes are fully automatic in that they only require initiation by the operator. The electronic circuitry comprising system 20 is described in detail below in connection with each of the operating modes.

Run Mode

Figure 5A:
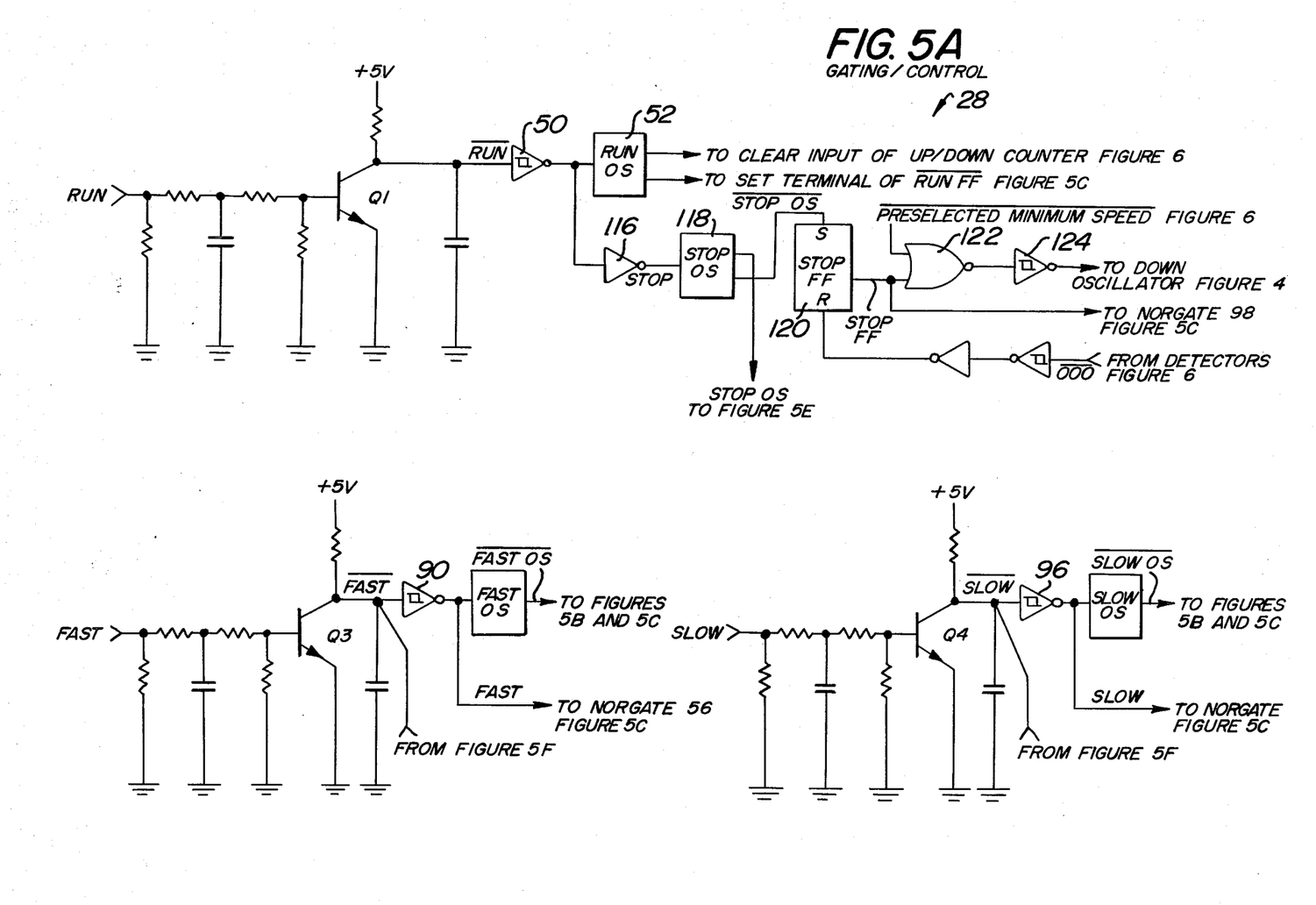
FIG. 5A-F are electrical schematics of portions of the Gating/Control.

By pressing the RUN button in control panel 24, motor 22 can be automatically brought up to a preselected minimum speed. Depressing the RUN button causes transistor Q1 in gating/control 28 to generate a $\overline{RUN}$ signal at its collector. See FIG. 5A. The digital signals generated in gating/control 28 and the other digital circuitry described hereinafter assume conventional binary values denoted "low" or "high". By "low" and "high", it is meant nominal signals of 0 and 5 volts, respectively. These are nominal voltages only. The actual voltages may vary somewhat from the nominal values. The low signal indicates a logic "0" and the high signal indicates a logic "1" according to conventional notation.

Figure 4:
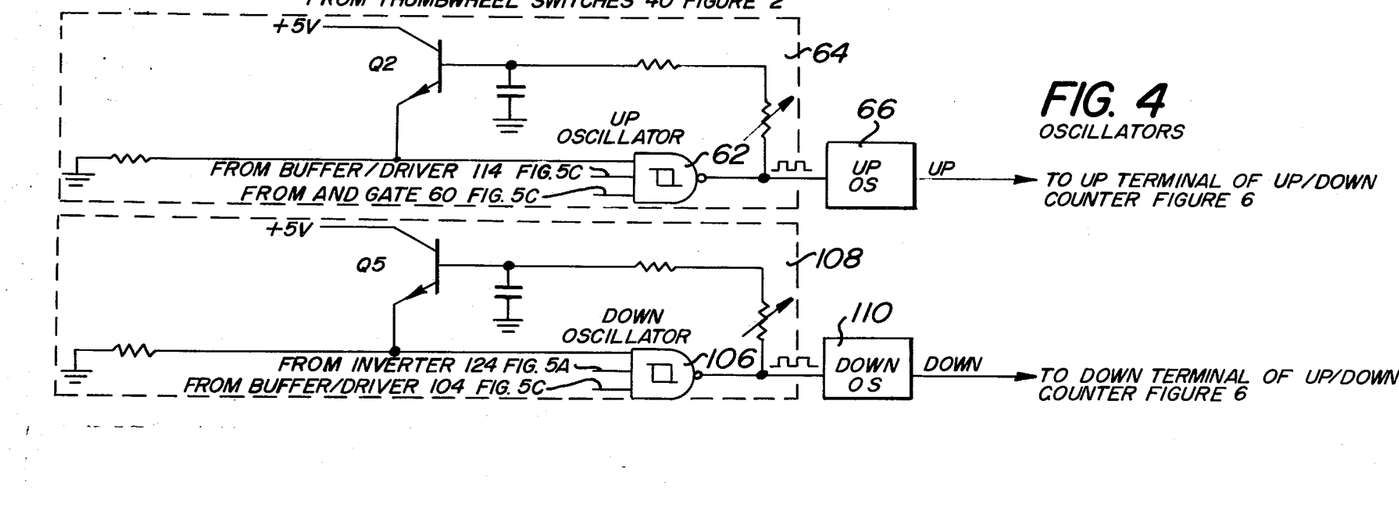
FIG. 4 is an electrical schematic of the pulse generator.
Figure 5B:
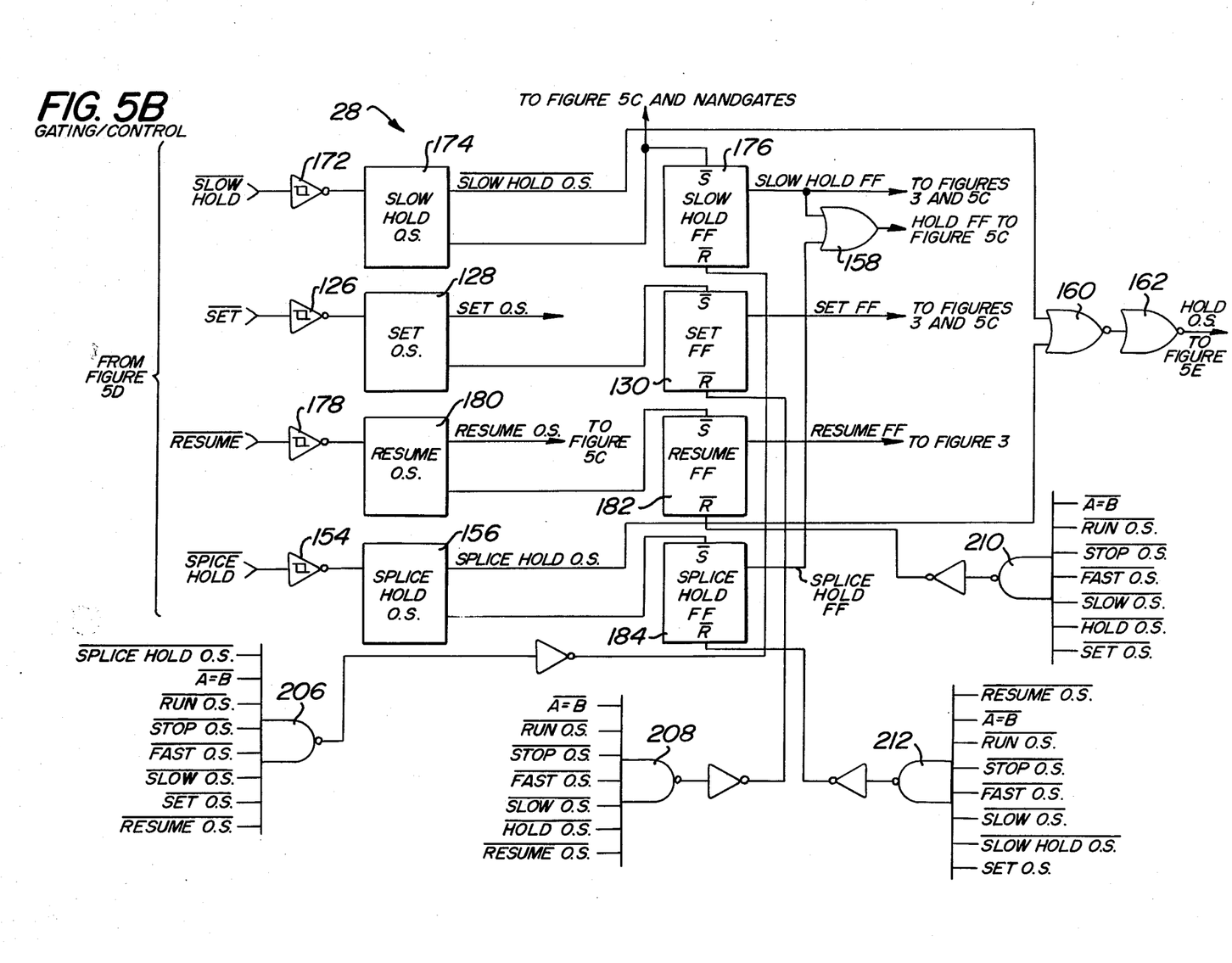
Figure 5C:
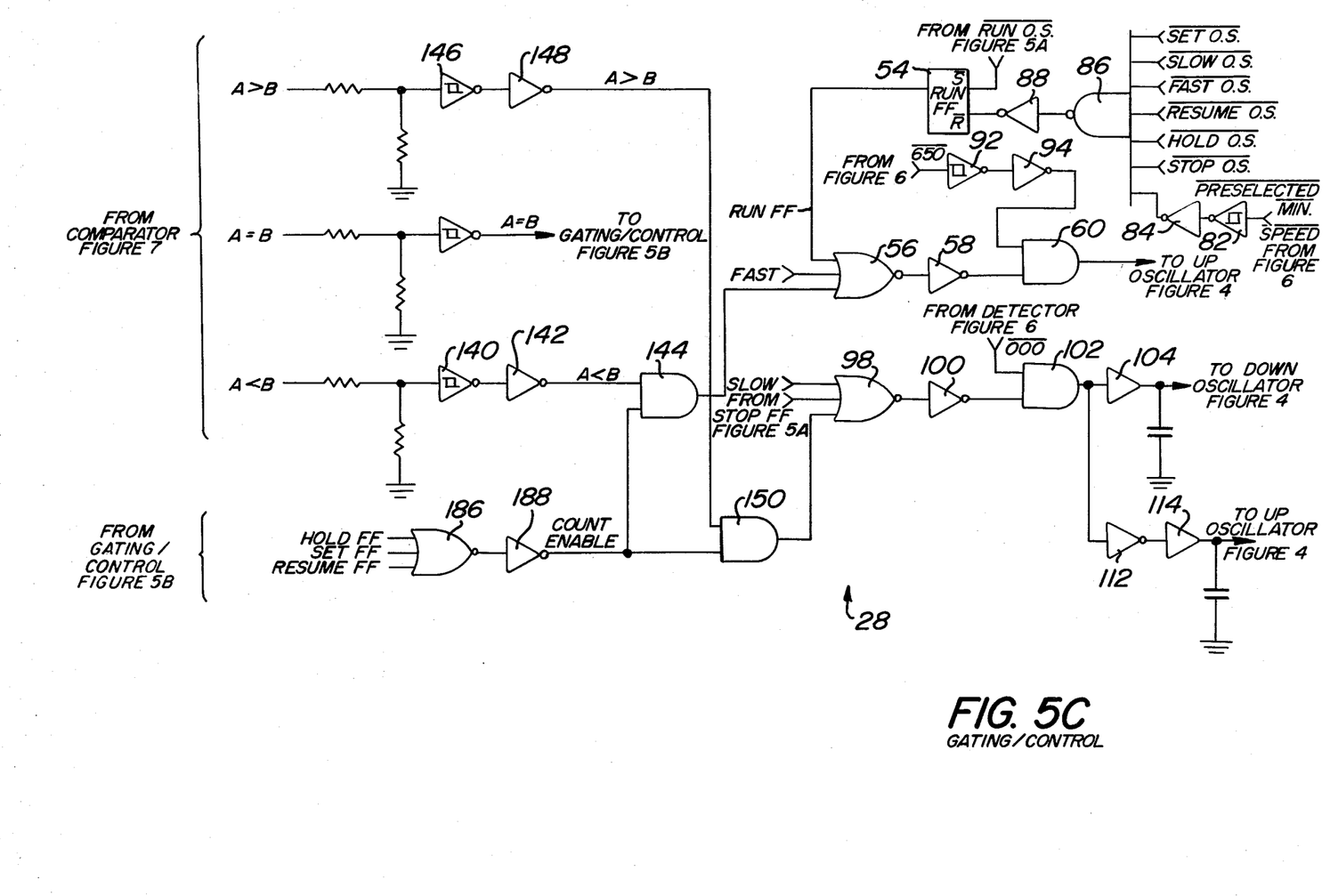

Transistor Q1 is a conventional buffer element having a resistor and capacitor configuration at its base for reducing the effects of noise at the RUN button. The $\overline{RUN}$ signal is inverted and shaped by Schmitt-trigger inverter 50. The output of inverter 50 triggers RUN one shot 52 which generates a pulse to clear the up/down counter. RUN one shot 52 also generates a complementary pulse which sets RUN flip-flop 54. See FIG. 5C. When set, flip-flop 54 generates a high RUN FF signal which causes the output of NOR gate 56 to go low. The output of NOR gate 56 is inverted to a high level by inverter 58 which causes the output of AND gate 60 to go high. The high output from AND gate 60 enables the NAND Schmitt-trigger 62 in Up oscillator 64 to produce an oscillating digital voltage or pulse train at its output. See FIG. 4. Transistor Q2 and the resistive and capacitive feedback elements connected to NAND Schmitt-trigger 62 comprise Up oscillator 64. The pulse train produced by NAND Schmitt-trigger 62 is fed to the Up one shot 66 which produces a series of shaped pulses in response.

Figure 6:
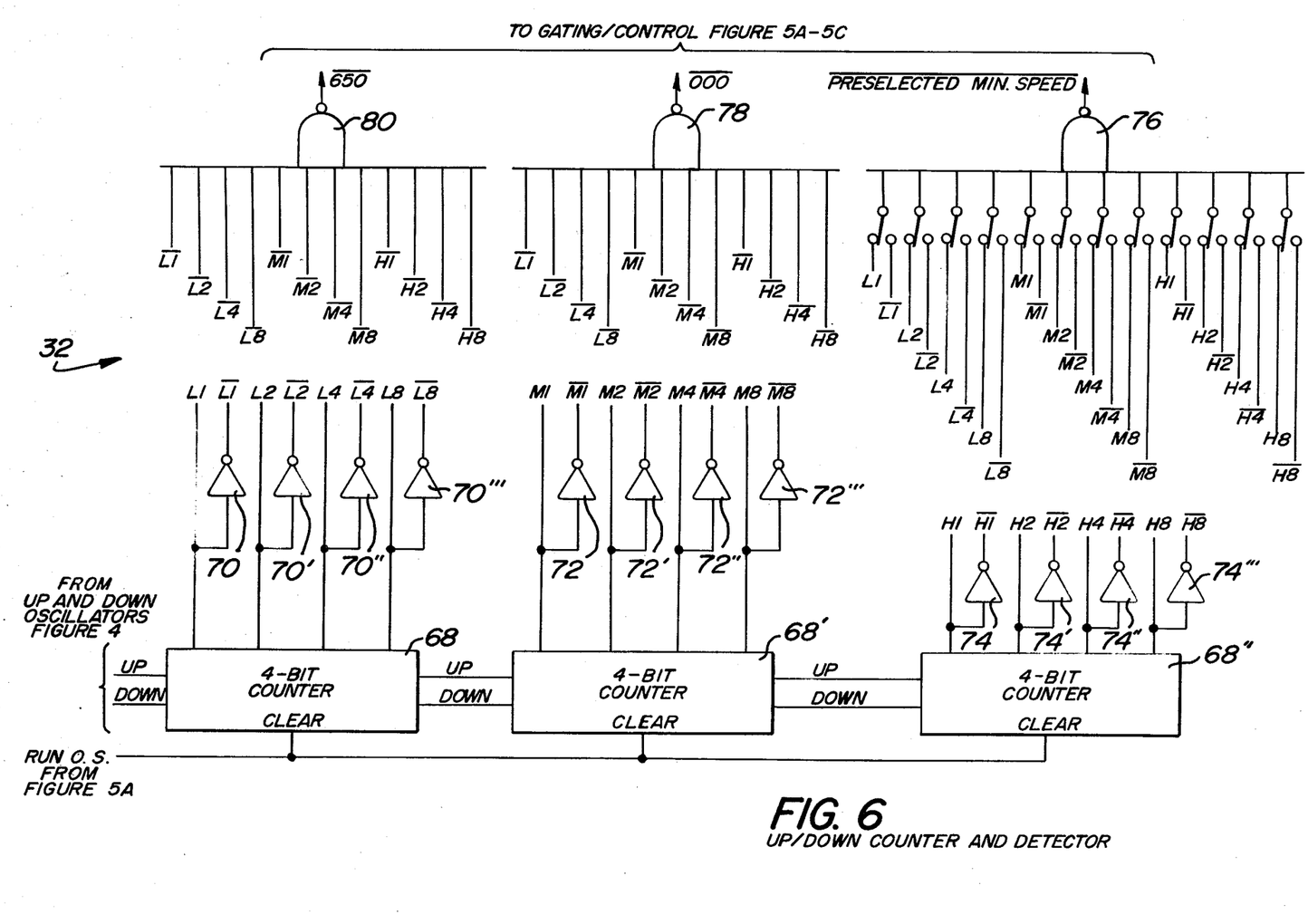
FIG. 6 is an electrical schematic of the up/down counter and detector.

The pulse output of Up one shot 66 is fed through the Up line to the Up terminal of up/down counter and detector 32. See FIG. 6. The counter portin 32a of circuit 32 comprises three cascaded four-bit counters 68, 68′ and 68″. The outputs L1, L2, L4 and L8 are the four least significant bits in a twelve-bit BCD word generated by the counters. The four intermediate bits are the outputs M1, M2, M4 and M8. The four most significant bits are outputs H1, H2, H4 and H8.

Counters 68, 68′ and 68″ count up the pulses at the Up line. The state of the counters is indicated by the levels of the outputs L1-L8, M1-M8 and H1-H8. The state of the counters represents the instantaneous set point speed to which motor 22 is being driven. The counter outputs are inverted by inverters 70, 70′, 70″, and 70‴ inverters 72, 72′, 72″ and 72‴ and inverters 74, 74′, 74″ and 74‴. See FIG. 6. The inverter oututs are used by the detector portion 32b of circuit 32, NAND gates 76, 78 and 80, as described in detail below.

In the RUN mode, the Up oscillator 64 is free-running until the preselected minimum motor speed is reached. When the twelve-bit BCD word generated by counters 68, 68′ and 68″ indicates the preselected minimum speed to which the motor 22 is to be driven, NAND gate 76 generates a Preselected Minimum Speed signal at its output. The preselected minimum speed is digitally represented by the inputs to NAND gate 76. The inputs are connected by means of switches S to those up/down counter outputs which will provide a digital representation of the desired preselected minimum speed. The Preselected Minimum Speed output of NAND gate 76 is inverted and shaped by Schmitt-trigger inverter 82 and re-inverted by inverter 84 in gating/control 28. See FIG. 5C. Inverter 84 drives the output of NAND gate 86 high. The output of NAND gate 86 is inverted by inverter 88 to a low signal which resets the RUN flip-flop 54. When reset, RUN flip-flop 54 inhibits the Up oscillator 64 by means of NOR gate 56, inverter 58 and AND gate 60. Accordingly, the set point speed signal at the up/down counter output hangs up at the preselected minimum speed and the output of D/A converter 36 remains constant. The motor 22 will be maintained at the preselected minimum speed by comparator 18. See FIG. 2.

Fast Mode

The FAST and SLOW modes are the two semi-automatic modes. In the FAST mode, motor 22 is driven from the preselected minimum speed, or any speed at which it is currently being maintained, to a faster speed. This is accomplished by merely depressing the FAST button on control panel 24 and releasing the button when the desired speed is reached.

By depressing the FAST button, the transistor Q3 in gating/control 28 is caused to generate a $\overline{\text{FAST}}$ signal at its collector. The transistor Q3 circuitry is identical to the circuitry of transistor Q1. The $\overline{\text{FAST}}$ output at the collector of transistor Q3 is shaped and inverted by Schmitt-trigger inverter 90. The output of inverter 90 drives the output of NOR gate 56 low. See FIG. 5C. Inverter 58 inverts the output of NOR gate 56 causing AND gate 60 to turn on Up oscillator 64. See FIG. 4. The Up oscillator generates pulses on the Up line to circuit 32 until either counters 68, 68' and 68'' reach the BCD count of 650 or the FAST button is released.

The 650 count represents the preselected maximum speed to which motor 22 can be driven. NAND gate 80 detects the 650 state of the counters and generates a low $\overline{650}$ signal at its output. See FIG. 6. The low $\overline{650}$ signal is inverted and shaped by Schmitt-trigger inverter 92 and re-inverted by inverter 94 in gating/control 28. See FIG. 5C. The output of inverter 94 drives the output of AND gate 60 low thereby inhibiting the Up oscillator 64. Accordingly, the set point speed signal at the up/down counter output hangs up at the preselected maximum speed and the output of D/A converter 36 remains constant. The motor 22 will be maintained at the preselected maximum speed by comparator 18.

If it is desired to increase the speed of motor 22, but not up to the maximum speed, the FAST button on control panel 24 may be depressed until the desired increase in set point speed is attained. The instantaneous set pont speed to which the motor 22 is being driven is indicated by remote LED display 48. When the display indicates the desired set point speed for motor 22, the FAST button is released. This restores NOR gate 56, inverter 58 and AND gate 60 to the inactive condition and inhibits the Up oscillator 64 from generating any further pulses. See FIG. 5C and 4. Accordingly, counters 68, 68' and 68'' hang up at the last count at which the Up oscillator was active and the motor 22 will be driven no higher than the set point speed corresponding to that count.

Slow Mode

The speed of motor 22 can be decreased from the preselected minimum speed, or any speed at which the motor is currently being run, to any desired slower speed. This is accomplished by merely depressing the SLOW button on control panel 24 and releasing the button when the desired speed is reached.

By depressing the SLOW button, the transistor Q4 in gating/control 28 is caused to generate a $\overline{\text{SLOW}}$ signal at its collector. See FIG. 5A. The transistor Q4 circuit is identical to the circuit of transistor Q1. The $\overline{\text{SLOW}}$ signal is inverted and shaped by Schmitt-trigger inverter 96. The output of inverter 96 drives the output of NOR gate 98 low thereby causing the output of inverter 100 to go high. See FIG. 5C. This drives the output of AND gate 102 high. The high output at AND gate 102 is reflected by buffer/driver 104 to the input of NAND Schmitt-trigger 106 in Down oscillator 108. See FIG. 4. This enables NAND Schmitt-trigger 106 to produce a series of pulses at its output. NAND Schmitt-trigger 106, transistor Q5 and the associated resistive and capacitive circuitry comprise Down oscillator 108 in pulse generator circuit 30. The pulses at the output of oscillator 108 trigger the Down one shot 110. One shot 110 drives the Down line to counter 68 in the up/down counter and detector circuit 32. See FIG. 6.

In response to the pulses generated by Down oscillator 108, counters 68, 68' and 68'' count down. The BCD output of the counters indicate the instantaneous set point speed to which the motor 22 is being driven. The counters continue to count down until either the desired decrease in speed is attained or the preselected minimum speed is reached.

When the counter state indicates the preselected minimum speed, the Down oscillator 108 will be inhibited. This prevents the set point speed from falling below the preselected minimum speed. NAND gate 76 detects the preselected minimum speed as already described in connection with the RUN mode. See FIG. 6. The $\overline{\text{Preselected Minimum Speed}}$ output of NAND gate 76 drives the output of NOR gate 122 low. See FIG. 5A. The low output of NOR gate 122 is reflected through Schmitt-trigger inverter 124 to the input of NAND Schmitt-trigger 106 in Down oscillator 108 thereby inhibiting the oscillator. See FIG. 4. Accordingly, the set point speed signal at the up/down counter output hangs up at the preselected minimum speed, and motor 22 is maintained at the preselected minimum speed as described in the RUN mode.

If it is desired to decrease the speed of motor 22 above the preselected minimum speed, the SLOW button should remain depressed until the desired set point speed to which the motor is to be driven is indicated at the remote LED display 48. When the SLOW button is released, the NOR gate 98, inverter 100, AND gate 102 and buffer/driver 104 are restored to the inactive condition. See FIG. 5C. This inhibits the Down oscillator 108. See FIG. 4. Counters 68, 68' and 68'' hang up at the last count at which the Down oscillator was active. Accordingly, motor 22 will be driven no lower than the set point speed correspnding to that count.

It should be noted that the Up oscillator 64 and the Down oscillator 108 cannot be active at the same time. This is insured by inverter 112 and buffer driver 114 in gating/control 28. See FIG. 5C. In the SLOW mode, the output of AND gate 102 is high. The output of AND gate 102 is inverted by inverter 112 and reflected through buffer/driver 114 to the input to Up oscillator 64 thereby inhibiting the oscillator. See FIG. 4. Accordingly, only the Down oscillator 108 is active in the SLOW mode. Conversely, in the FAST mode, the output of AND gate 102 is low. The low output is inverted by inverter 112 and reflected through buffer/driver 114 to the input of the Up oscillator 64 thereby enabling the oscillator. Accordingly, only the Up oscillator 64 is active in the FAST mode.

It should also be appreciated that, in the FAST and SLOW modes, the Up and Down oscillators are steered by the operator through gating/control 28. Thus, by depressing and selectively releasing the FAST or SLOW button, the operator determines the speed to which motor 22 is varied.

Stop Mode

The motor 22 can be brought to a stop automatically from the preselected minimum speed, or from any speed at which the motor is currently being run. This is accomplished by merely depressing the STOP button on control panel 24.

When the STOP button is depressed, it actuates a relay (not shown) which reverses the RUN signal input to the gating/control circuit 28. See FIG. 5A. This in turn reverses the $\overline{\text{RUN}}$ signal input to Schmitt-trigger inverter 50 and the output of that inverter. The output of inverter 50 is itself inverted by inverter 116 which generates a STOP signal. The STOP signal triggers STOP one shot 118. STOP one shot 118 generates a $\overline{\text{STOP}}$ one shot pulse to set the STOP flip-flop 120.

The output of STOP flip-flop 120 appears at the input to NOR gate 98. See FIG. 5C. The output of NOR gate 98 accordingly goes low, and inverter 100, AND gate 102 and buffer/driver 104 operate to turn on the Down oscillator 108 as already described in connection with the SLOW mode.

The Down oscillator 108 continues to run until the counters 68, 68' and 68" reach the 000 state. See FIG. 6. When this occurs, the NAND gate 78 generates a low $\overline{000}$ signal which is fed to the input to AND gate 102. See FIG. 5C. The $\overline{000}$ signal is transferred through buffer/driver 104 to the input to NAND Schmitt trigger 106 in the Down oscillator circuit. See FIG. 4. This inhibits the Down oscillator when the motor is stopped.

At the same time, the $\overline{000}$ signal is fed through AND gate 102 to inverter 112. See FIG. 5C. The signal is inverted by inverter 112 and transferred by buffer/driver 114 to the input to NAND Schmitt trigger 62 in Up oscillator circuit 64. See FIG. 4. The Up oscillator, however, will not be enabled because the RUN flip-flop 54 will have been reset by the operation of NAND gate 86 and inverter 88 in response to the $\overline{\text{STOP one shot}}$ signal in gating/control circuit 28. See FIG. 5C. When reset, RUN flip-flop 54 causes NOR gate 56, inverter 58 and AND gate 60 to generate a low signal at the input to NAND Schmitt trigger 62 in the Up oscillator circuit 64 thereby inhibiting the Up oscillator. See FIG. 4.

It should be recalled that NOR gate 122 and Schmitt-trigger inverter 124 in gating/control circuit 28 operate to inhibit the Down oscillator when the speed of motor 22 is reduced to the preselected minimum speed and the system is not in the STOP mode. See FIG. 5A. In the STOP mode, however, the STOP FF output of STOP flip-flop 120 is high thereby disabling NOR gate 122 and preventing it from inhibiting the Down oscillator 108. Therefore, the Down oscillator continues to run in the STOP mode as the set point speed drops below the preselected minimum speed. In the STOP mode, the Down oscillator 108 is inhibited only when the set point speed is reduced to zero, that is, only when the motor is stopped.

Set Mode

The motor 22 can be commanded to run at any desired speed above the preselected minimum speed in the SET mode. This is achieved by manipulating the adjustable reference speed thumb wheel switches 40 and depressing the SET button on control panel 24. See FIG. 2.

Figure 3:
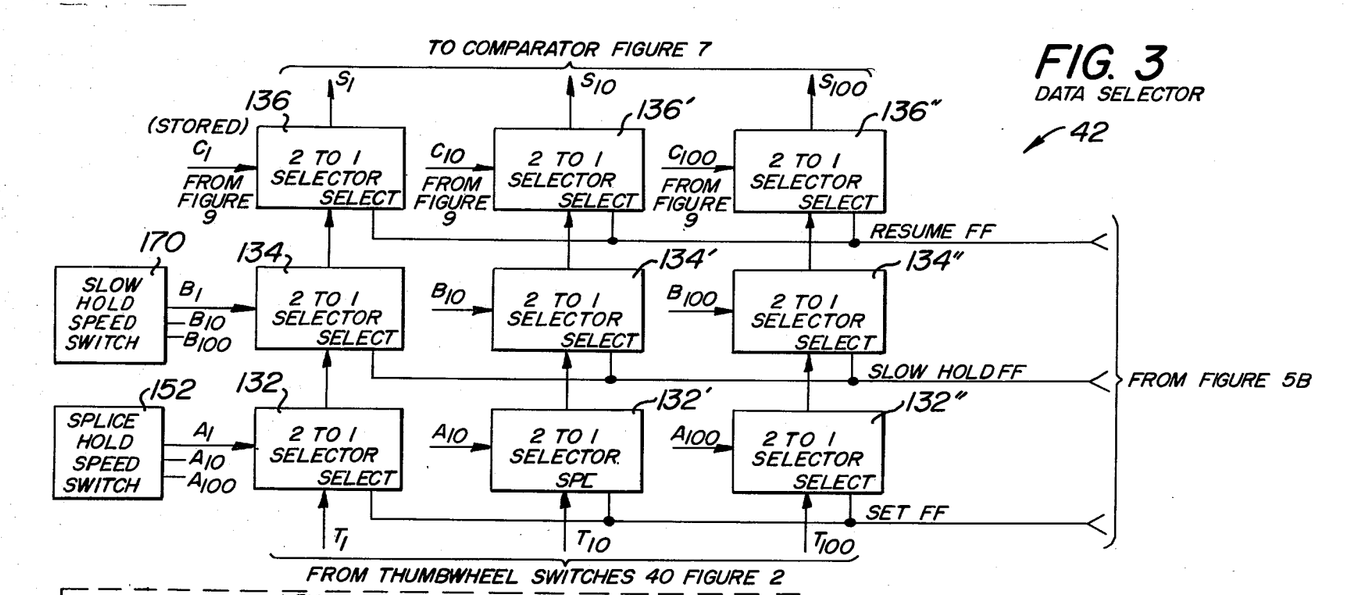
FIG. 3 is an electrical schematic of the data selector.

Adjustable reference speed thumb wheel switches 40 comprise three BCD rotary thumb wheel switches such as the EECO 2000 series switches. The BCD outputs of the rotary switches are designated T1, T10 and T100 as shown in FIG. 3. Each of the lines actually represents four binary outputs. The T1 line represents the least significant digit, the T10 line represents the intermediate digit, and the T100 line represents the most significant digit.

The outputs of thumb wheel switches 40 are fed to the Data selector 42. See FIG. 3. Data selector 42 compriss three rows of three "2" to "1" selectors. The top and bottom rows may be TI 74157 quadruple 2-line-to-1-line data selectors/multiplexers while the middle row may be TI 74158 selectors/multiplexers.

Figure 5D:
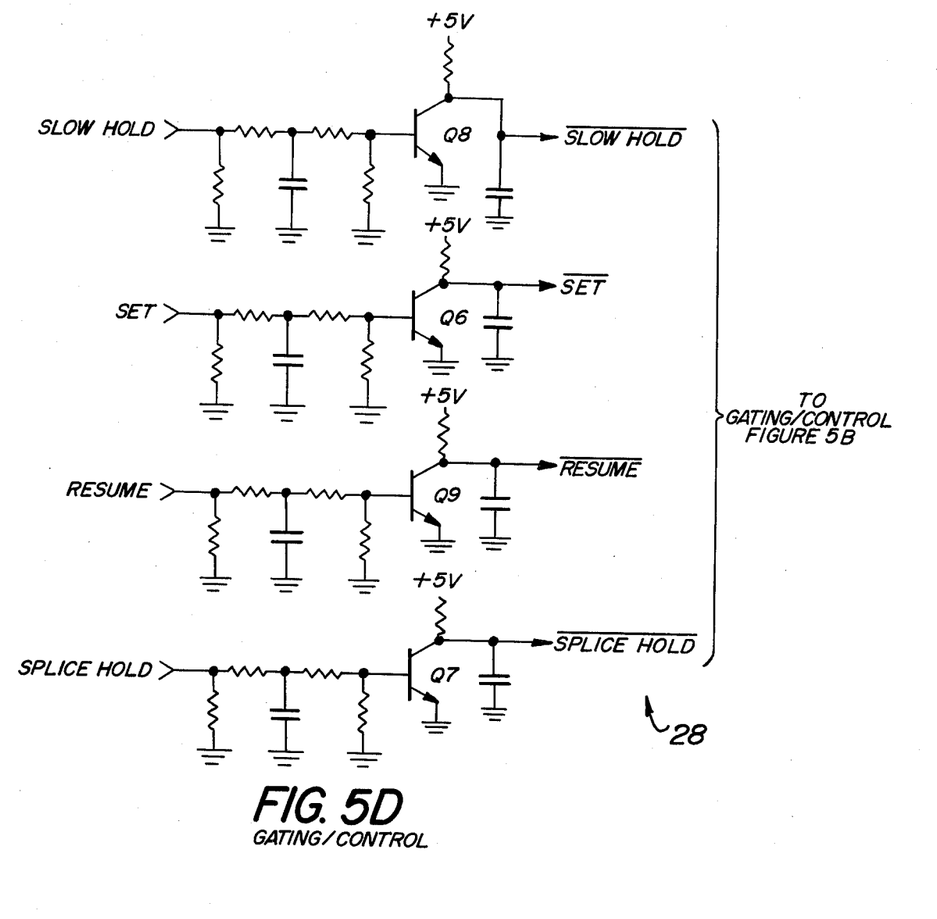

When the SET button is depressed, transistor Q6 in gating/control circuit 28 is caused to generate a $\overline{\text{SET}}$ signal at its collector. See FIG. 5D. The $\overline{\text{SET}}$ signal is inverted and shaped by Schmitt-trigger inverter 126 to trigger the SET one shot 128. See FIG. 5B. The SET one shot sets the SET flip-flop 130, causing the SET FF output of the flip-flop to go high. This actuates 2 to 1 selectors 132, 132' and 132" which transfer the T1, T10 and T100 signals through 2 to 1 selectors 134, 134' and 134" and 136, 136' and 136" to comparator 44. See FIG. 3. The outputs of data selector 42 are denoted S1, S10 and S100 to indicate the BCD signals selected by the data selector for transmission to the comparator 44.

Figure 7:
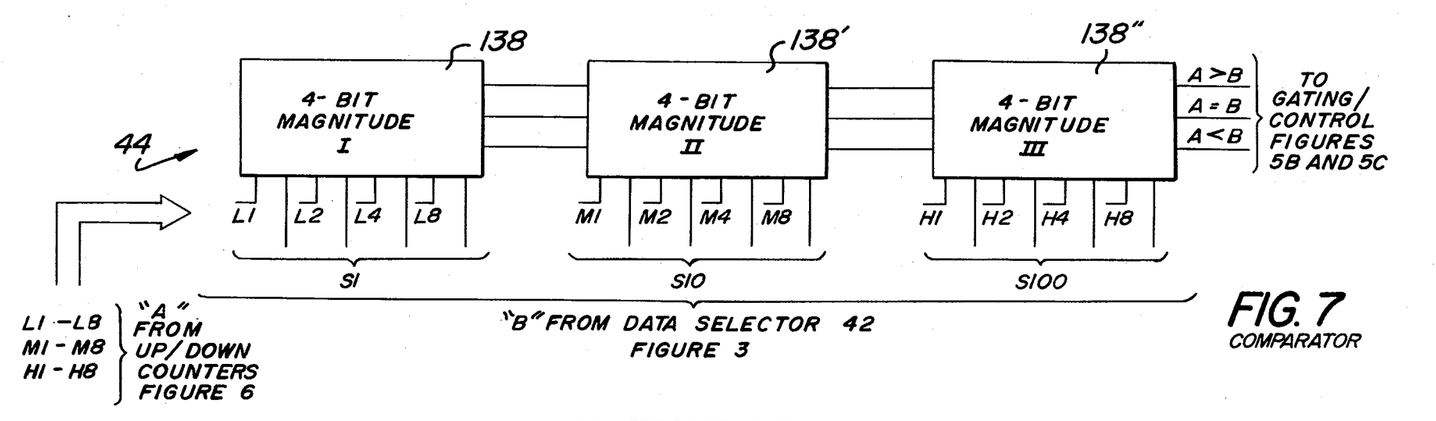
FIG. 7 is an electrical schematic of the comparator.

Comparator 44 comprises three cascaded four-bit magnitude comparators such as TI 7485 4-bit magnitude comparators. See FIG. 7. Comparators 138, 138' and 138" compare the data selector BCD outputs to the up/down counter BCD outputs and generate the "A > B", "A = B" and "A < B" outputs in response. The up/down counter BCD outputs are denoted "A". The data selector BCD outputs are denoted "B". The comparator outputs steer the Up and Down oscillators 64 and 108 by means of gating/control 28.

If the adjustable reference speed represented by thumb wheel switch outputs T1, T10 and T100 is greater than the instantaneous set point speed indicated by the up/down counter BCD outputs, the comparator output A < B will be generated. The A < B signal is inverted and shaped by Schmitt-trigger inverter 140 and reinverted by inverter 142 causing the outut of AND gate 144 to go high. See FIG. 5C. This disables the NOR gate 56 which operates in conjunction with inverter 58 and AND gate 60 to activate the Up oscillator 64 as described in connection with the FAST mode.

The Up oscillator 64 continues to generate pulses until the BCD outputs of the up/down counter equals the T1, T10 and T100 outputs of the adjustable reference speed thumb wheel switches 40. At this time, the A < B output of comparator 44 will reverse causing Schmitt-trigger inverter 140, inverter 142, AND gate 144, NOR gate 56, inverter 58 and AND gate 60 to inhibit Up oscillator 64. Thus, when the set point speed indicated at the output of the up/down counter equals the adjustable reference speed set by switches 40, the Up oscillator is inhibited.

If the adjustable reference speed indicated by the outputs T1, T10 and T100 is less than the set point speed indicated by the up/down counter BCD outputs, the A > B output of comparator 44 will be generated. This causes Schmitt-trigger inverter 146, inverter 148 and AND gate 150 to disable NOR gate 98 causing inverter 100, AND gate 102 and buffer/driver 104 to activate the Down oscillator 108 as described in connection with the SLOW Mode. See FIG. 5C. The Down oscillator continues to generate pulses until the BCD outputs of the up/down counter equal the adjustable reference speed thumb wheel switch outputs T1, T10 and T100. This indicates that the set point speed indicated by the up/down counter equals the adjustable reference speed. At this time, the A > B of the comparator will reverse causing the Down oscillator to be inhibited.

Typically, the adjustable reference speed is lower than the normal operating speed of motor 22, although higher than the preselected minimum speed. If the motor is being operated at a speed higher than the adjustable reference speed, the Down oscillator 108 is activated to decrese the motor speed. On the other hand, if the operating speed is less than the adjustable reference speed, the Up oscillator 64 is activated to increase the motor speed. The motor speed is automatically varied to reach the adjustable reference speed once the thumb wheel switches 40 are set and the SET button is depressed.

Splice Hold

In a corrugator, the motor speed must be reduced while material from one roll is being spliced to another roll. The speed to which the motor must be reduced is known and can be preset into speed control system 20.

The preset reference speed in the SPLICE HOLD mode is preset into the system by means of the SPLICE HOLD switches 152 in the data selector 42. See FIG. 3. In contrast to thumb wheel switches 40, these switches are not adjustable during operation of the machine. The motor speed can be automatically varied to the preset reference speed merely by depressing the SPLICE HOLD button on panel 26. See FIG. 2.

Figure 5E:
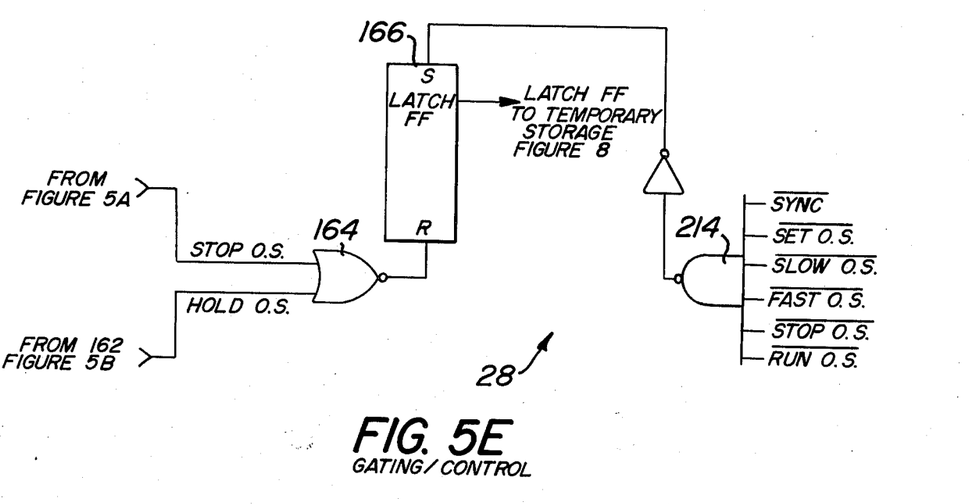

By depressing the SPLICE HOLD button, transistor Q7 in gating/control circuit 28 is caused to generate a SPLICE HOLD signal at its collector. See FIG. 5D. The SPLICE HOLD signal is inverted and shaped by Schmitt-trigger inverter 154 which triggers the SPLICE HOLD one shot 156. SPLICE HOLD one shot 156 generates a SPLICE HOLD one shot pulse which is reflected through NOR gates 160, 162 and 164 to reset the latch flip-flop 166 in temporary storage circuit 34. See FIGS. 5B and 5E. The Latch FF output of flip-flop 166 enables the Temporary Storage circuit 34 to store the BCD outputs of the up/down counter. See FIG. 8.

Figure 8:
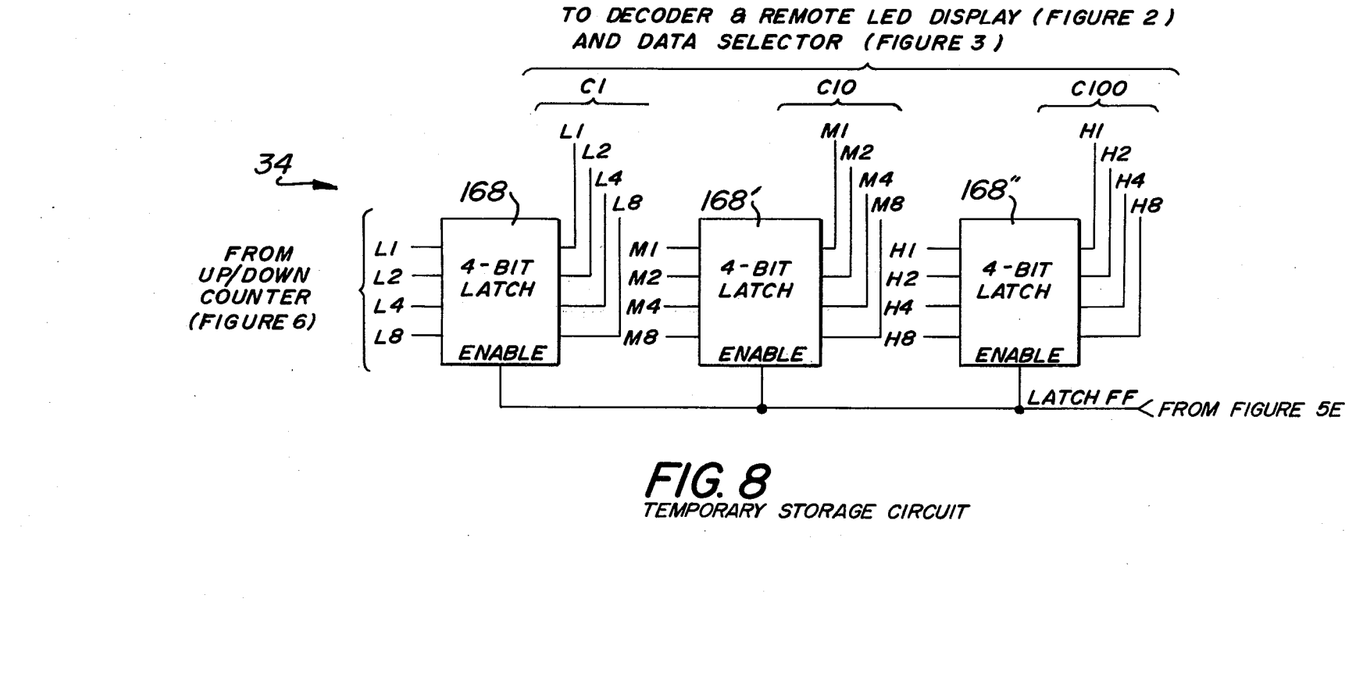
FIG. 8 is an electrical schematic of the temporary storage circuit.

Temporary Storage circuit 34 comprises three 4-bit latches such as the TI 7475 4-bit bistable latches. The up/down counter BCD outputs are "stored" by transferring the outputs to the latch BCD outputs denoted C1, C10 and C100. Output C1 corresponds to the least significant BCD digit. Output C10 corresponds to the intermediate BCD digit. Output C100 corresponds to the most significant BCD digit. These outputs are used to restore motor 22 to the speed at which it was operated when the SPLICE HOLD mode was initiated. This is explained more clearly hereinafter in connection with the description of the RESUME mode.

The outputs A1, A10 and A100 of SPLICE HOLD speed switch 152 are BCD outputs representing the preset reference speed to which the motor 22 is to be driven during a splicing operation. SPLICE HOLD speed switch 152 may comprise three AMP hexa-decimal switches. In the SPLICE HOLD mode, data selector 42 transmits the outputs A1, A10 and A100 to the S1, S10 and S100 lines respectively. See FIG. 3. Comparator 44 compares the SPLICE HOLD speed switch outputs A1, A10 and A100 to the BCD outputs of the up/down counter. See FIG. 7. The comparator outputs A > B, A = B and A < B steer the Up and Down oscillators 64 and 108 until the BCD outputs of the up/down counter equal the BCD outputs of the SPLICE HOLD speed switch 152, that is, until the set point speed represented by the up/down counter outputs equals the preset reference speed represented by the SPLICE HOLD speed switch outputs. The speed of motor 22 will then be maintained at the preset reference speed set by the SPLICE HOLD speed switch.

Slow Hold

It may be desired to run the motor 22 at another preset reference speed. For example, it may be desired to run the motor at a slower speed than the speed at which it is run during the SPLICE HOLD mode to permit personnel to manually adjust certain portions of the corrugator machinery. For this purpose. a SLOW HOLD button is provided on panel 26. By depressing the SLOW HOLD button, the speed of motor 22 is automatically varied to this preset reference speed. The SLOW HOLD mode is similar to the SPLICE HOLD mode as will be more clearly understood from the following description.

The preset reference speed in the SLOW HOLD mode is set by means of SLOW HOLD speed switch 170 in the data selector 42. See FIG. 3. Speed switch 170 comprises three AMP hexa-decimal switches for providing BCD signals B1, B10 and B100 to data selector 42. Signals B1, B10 and B100 represent the SLOW HOLD preset reference speed to which motor 22 is to be driven. SLOW HOLD speed switch 170 is preset and is not adjustable during the operation of the corrugator.

When the SLOW HOLD BUTTON is depressed, it causes transistor Q8 to generate a SLOW HOLD signal at its collector. See FIG. 5D. The SLOW HOLD signal is inverted and shaped by Schmitt-trigger inverter 172 to trigger SLOW HOLD one shot 174 which sets SLOW HOLD flip-flop 176. See FIG. 5B. The SLOW HOLD FF output of flip-flop 176 operates data selector 42 to cause signals B1, B10 B100 to appear at the S1, S10 and S100 lines respectively. See FIG. 3.

Comparator 44 compares the S1, S10 and S100 line signals to the BCD outputs of the up/down counter to bring motor 22 to the SLOW HOLD preset reference speed. See FIG. 7. The operation of the comparator, Up oscillator 64, Down oscillator 108 and up/down counter 32 is identical to that in the SPLICE HOLD mode already described.

It should be noted that, in the SLOW HOLD mode, the SLOW hold one shot output of one shot 174 is reflected through NOR gates 160, 162 and 164 to reset the latch flip-flop 166. See FIGS. 5B and 5E. When reset, latch flip-flop 166 causes temporary storage circuit 34 to store the BCD outputs of up/down counter 32 at the time the SLOW HOLD mode is initiated as already described in connection with the SPLICE HOLD mode. The C1, C10 and C100 outputs of temporary storage circuit 34 retain the stored count for use in connection with the RESUME mode.

Resume Mode

The RESUME mode is used to restore the speed of motor 22 to the speed at which the motor was operated when either the SPLICE hold or SLOW HOLD mode was initiated. The motor speed is automatically restored merely by depressing the RESUME button on panel 26.

When the RESUME button is depressed, transistor Q9 generates a RESUME signal at its collector. See FIG. 5D. The RESUME signal is inverted and shaped by Schmitt-trigger inverter 178 to trigger the RESUME one shot 180. See FIG. 5B. The RESUME one shot sets the RESUME flip-flop 182 which generates a RESUME FF signal. The RESUME FF signal operates data selector 42 causing the data selector to transmit the C1, C10 and C100 outputs from temporary storage circuit 34 to the S1, S10 and S100 lines. See FIG. 3.

The C1, C10 and C100 signals represent the BCD count in up/down counter 32 when either the SPLICE HOLD or SLOW HOLD mode was initiated. That is, the signals represent the set speed to which motor 22 was beng driven when the SPLICE HOLD or SLOW HOLD modes were initiated.

Comparator 44 steers the Up and Down oscillators in response to the S1, S10 and S100 signals, as previously described in connection with the SPLICE HOLD and SLOW HOLD modes, to restore motor 22 to its prior speed at the time the SPLICE HOLD or SLOW HOLD mode was initiated.

Count Enable

It should be noted that comparator 44 is only operated in the automatic modes SEt, SPLICE HOLD, SLOW HOLD and RESUME. In the RUN and STOP modes and the semi-automatic modes, FAST and SLOW, the comparator 44 is prevented from steering the Up oscillator 64 and Down oscillator 108.

In the automatic modes in which the comparator is active, either the SET flop-flop 130, SPLICE HOLD flip-flop 184, SLOW HOLD flip-flop 176 or RESUME flip-flop 182 will be set by its associated one shot in gating/control 28. See FIG. 5B. The SLOW HOLD FF and SPLICE HOLD FF outputs are fed to OR gate 158. The HOLD FF output of OR gate 158 and the SET FF and RESUME FF outputs are fed to NOR gate 186. See FIG. 5C. The inputs to NOR gate 186 therefore are only high in the automatic modes SEt, SPLICE HOLD, SLOW HOLD and RESUME. If any of the inputs to NOR gate 186 is high, its output will go low causing the COUNT ENABLE output of inverter 188 to go high. This enables AND gates 144 and 150 to transmit the comparator outputs which steer the Up and Down oscillators as already described.

On the other hand, in the semi-automatic modes, FAST and SLOW, none of the inputs to NOR gate 186 will be high and the COUNT ENABLE output of inverter 188 will be low. This disables AND gates 144 and 150 from transmitting the comparator outputs. Accordingly, the comparator is prevented from steering the Up and Down oscillators.

Sync Mode

In a corrugator, the single facer motor may be slaved to the double facer motor to cause the speed of web material in the single facer machine to match the speed of web material in the double facer machine. This is accomplished in the SYNC mode by merely depressing the SYNC button on panel 26.

Figure 5F:
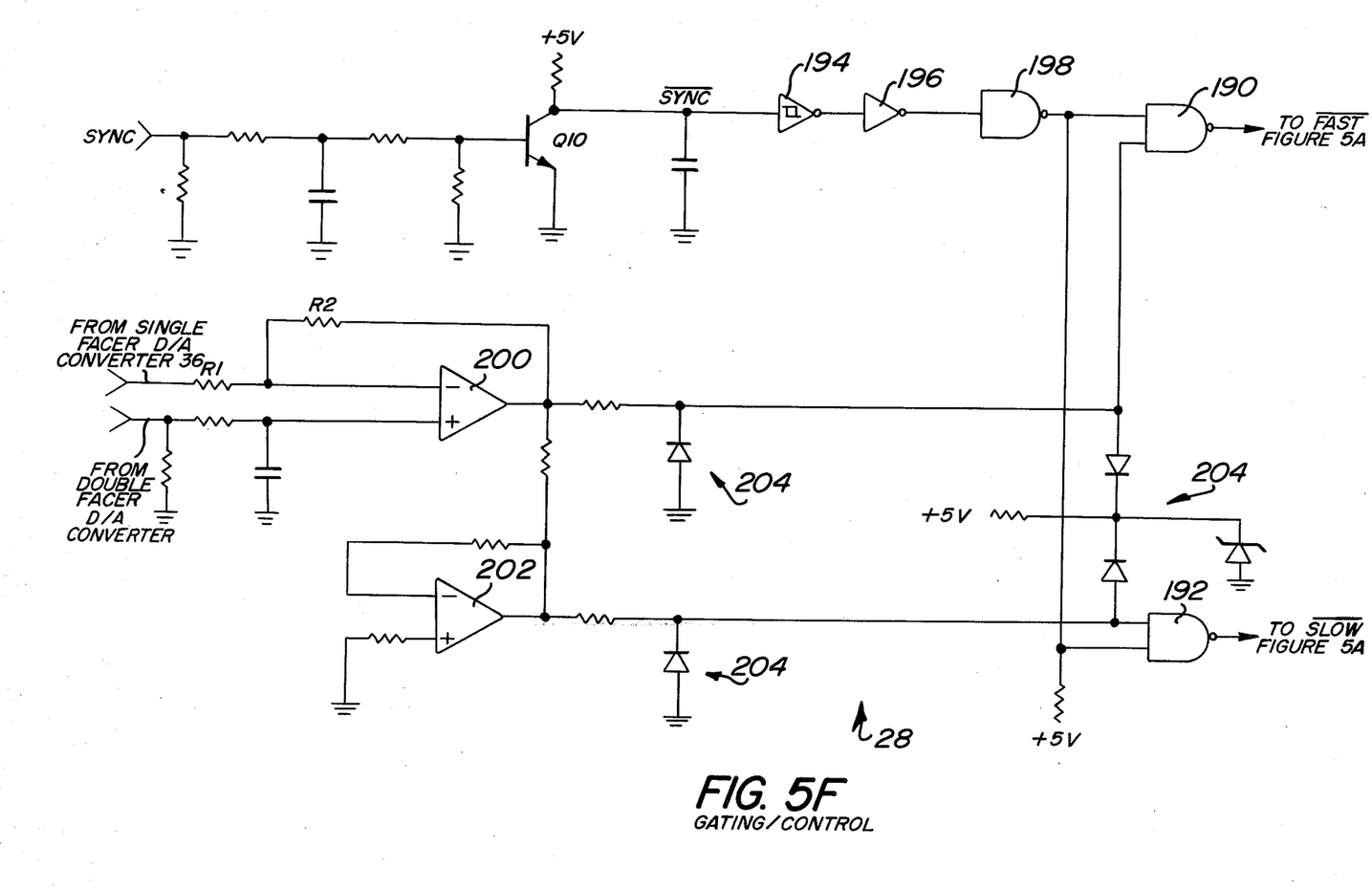

When the SYNC button is depressed, transistor Q10 is caused to generate a SYNC signal at its output. See FIG. 5F. The SYNC signal is inverted, shaped and fed to NAND gates 190 and 192 through Schmitt-trigger inverter 194, inverter 196 and NAND gate 198. The outputs of NAND gates 190 and 192 are fed to the FAST and SLOW lines in gating/control circuit 28. See FIG. 5A.

The output of NAND gate 190 steers the Up oscillator in response to the output of operational amplifier 200. The output of NAND gate 192 steer the Down oscillator in response to the output of operational amplifier 202. See FIG. 5F.

The speed of the double facer motor is controlled by speed control system 20'. See FIG. 2. System 20' is identical to speed control system 20 and includes a D/A converter 36' (not shown) identical to D/A converter 36 in system 20.

Operational amplifier 200 generates an output signal indicative of the difference between the single facer and double facer D/A converter outputs. The output of operational amplifier 200 is inverted by operational amplifier 202. The diode configuration 204 maintains the voltages at the inputs to NAND gates 190 and 192 at low or high digital levels in response to the outputs of operational amplifiers 200 and 202. If the single facer D/A converter output in system 20 is greater than the double facer D/A converter output in system 20', indicating that the set point single facer motor speed is less than the set point double facer motor speed, the inputs to NAND gate 192 will both be high. The output of NAND gate 192 will therefore inhibit the Down oscillator. The input to NAND gate 190, however, will be low, causing the Up oscillator 64 to be activated as already described in connection with the FAST mode. Accordingly, the single facer set point motor speed will be brought up to the double facer set point motor speed. When the set point single facer motor speed is brought up to the set point double facer motor speed, the output of operational amplifier 200 will drive the output of NAND gate 190 low to disable the Up oscillator 64.

If the set point single facer motor speed is greater than the set point double facer motor speed, the output of operational amplifier 202 will drive the output of NAND gate 190 high thereby activating the Down oscilltor 108 as already described in connection with the SLOW mode. The set point single facer motor speed will therefore be reduced to the set point double facer motor speed, and the output of operational amplifier 202 will drive the output of NAND gate 192 low thereby inhibiting the Down oscillator.

The synchronous operation of the single facer and double facer motors in the SYNC mode is constrained by the preselected minimum and maximum speeds for the double facer motor in system 20'. System 20' prevents the double facer motor speed from falling below its preselected minimum speed and from exceeding its preselected maximum speed. Accordingly, the single facer motor speed will be prevented from falling below the double facer preselected minimum speed and from exceeding the double facer maximum speed.

Digital Display

The remote LED display 48 follows the temporary storage circuit outputs C1, C10 and C100. In all modes but the SPLICE HOLD and SLOW HOLD modes, the outputs C1, C10 and C100 follow the up/down counter BCD outputs. Thus, in all modes but the SPLICE HOLD and SLOW HOLD modes the display 48 provides a digital indication of the instantaneous speed to which the single facer motor is being driven.

In the SPLICE HOLD and SLOW HOLD modes, the display 48 continues to provide a digital indication of the set point speed immediately prior to initiation of the mode instead of providing an indication of the changing set point speed to which motor 22 is being driven. This is due to the storage feature of circuit 34. Thus, in the SPLICE HOLD and SLOW HOLD modes, the HOLD one shot signal causes NOR gate 164 to reset latch 166, causing the storage circuit outputs C1, C10 and C100 to remain at or "store" the up/down counter BCD outputs which indicate the motor speed at the time the mode was initiated. See FIGS. 5B and 5E. The display 48 continues to indicate the stored speed in response to the stored circuit outputs C1, C10 and C100. When the SPLICE HOLD or SLOW HOLD modes are exited, however, the temporary storage circuit outputs C1, C10 and C100 resume tracking the up/down counter BCD outputs, and the display 48 again provides an indication of the instantaneous set point speed to which the motor is being driven.

Override

Operation in any mode will override a previous command to operate in another mode with a single exception. If system 20 is being operated in the STOP mode, the motor must automatically be brought to zero speed before operation in another mode is permitted.

The override feature is provided by NAND gates 206, 208, 210 and 212 and NAND gates 86 and 214. See FIGS. 5B, 5C and 5E.

The SLOW HOLD mode can be overriden by depressing any of the other buttons on panels 24 and 26 to cause NAND gate 206 to reset SLOW HOLD flip-flop 176. See FIG. 5B. The SET mode can be overriden by depressing any of the other buttons on panels 24 and 26 to cause NAND gate 208 to reset SET flip-flop 130. The RESUME mode can be overriden by depressing any of the other buttons on panels 24 and 26 to cause NAND gate 210 to reset the RESUME flip-flop 182. The SPLICE HOLD mode can be overriden by depressing any of the other buttons on panels 24 and 26 to cause NAND gate 212 to reset SPLICE HOLD flip-flop 184. The RUN mode can be overriden by depressing any of the other buttons on panels 24 and 26 to cause NAND gate 86 to reset RUN flip-flop 54. See FIG. 5C.

NAND gate 214 provides means for overriding the storage feature of temporary storage circuit 34. Thus, if any of the buttons on control panels 24 and 26 are depressed except for the SPLICE HOLD and SLOW HOLD buttons, the NAND gte 214 will set latch flip-flop 166 thereby inhibiting the temporary storage circuit 34 from storing the up/down counter BCD outputs. Accordingly, the storage circuit outputs C1, C10 and C100 will follow the up/down counter outputs as previously described in any mode but the SPLICE HOLD and SLOW HOLD modes.

The basic logic elements which comprise the blocks shown in FIG. 2 are well-known in the art. The Schmitt-trigger inverters may be TI 7414 hex-Schmitt-trigger inverters; the one shots may be TI 74121 monostable multivibrators with Schmitt-trigger inputs; the flip-flops TI 74279 quadruple $\overline{S}$-$\overline{R}$ latches; the NOR gates may be TI 7427 triple 3-input positive NOR gates; the inverters may be TI 7404 hex inverters; the AND gates may be TI 7408 quadruple 2-input positive AND gates; the NAND Schmitt-triggers may be TI 7413 dual four-input positive NAND Schmitt-triggers; the four-bit counters may be TI 74192 synchronous four-bit up/down counters; the NAND gates may be TI 74S133 13-input positive NAND gates or TI 7430 8-input positive NAND gates; and the buffers/drivers may be TI 7407 hex buffer/drivers with open collector high voltage outputs.

The advantages of the invention include both semi-automatic and automatic modes for varying the motor speed, the elimination of mechanical parts such as motor operated potentiometers to control the motor speed, continuous digital display of the set point speed signal to which the motor is being driven, memory capability in certain of the automatic modes, and the ability to automatically restore the motor speed to a prior speed, in addition to other control features described above.

The present invention may be embodied in other specific forms without departing from the spirit or essential attributes thereof and, accordingly, reference should be made to the appended claims, rather than to the foregoing specification as indicating the scope of the invention.

I claim:

1. An improved speed control for a corrugator having at least one single facer machine operatively associated with a double facer machine, each of said machines including a motor, comprising:

digital means for automatically generating a preselected digital set point signal indicative of a preselected minimum speed for the single facer machine motor;

digital means for generating first and second digital set point signals indicative of first and second speeds for said single facer machine motor, said first and second speeds being not less than said preselected minimum speed;

digital means for selectively storing said first digital set point signal while the speed of the single facer machine motor is varied;

means for automatically bringing the single facer machine motor speed up to said preselected minimum speed in response to said preselected digital set point signal and for varying the speed of the single facer machine motor between said first and second speeds in response to said first and second digital set point signals; and means for automatically restoring the single facer machine motor speed to said first speed in response to said stored digital set point signal.

2. The improved speed control according to claim 1 including means for automatically varying the speed of the single facer machine motor in synchronism with the speed of the double facer machine motor.

3. A speed control for a system having at least first and second motors operatively associated with each other, comprising:

digital means for automatically generating a preselected digital set point signal indicative of a preselected minimum speed for said first motor;

digital means for generating first and second digital set point signals indicative of first and second speeds for said first motor, said first and second speeds being not less than said preselected minimum speed;

digital means for selectively storing said first digital set point signal while the speed of said first motor is varied from said first speed;

means for automatically bringing the first motor speed up to said preselected minimum speed in response to said preselected digital set point signal and for varying the speed of said first motor between said first and second speeds in response to said first and second digital set point signals; and means for automatically restoring the first motor speed to said first speed from said second speed in response to said stored first set point signal, 4. The system according to claim 3 including means for automatically varying the speed of said first motor in synchronism with the speed of said second motor.

5. The system according to claim 3 wherein said first motor speed varying means includes means for preventing the speed of the first motor from falling below said preselected minimum speed.

6. An improved speed control for a corrugator having at least one single facer machine operatively associated with a double facer machine, each of said machines including a motor, comprising:
a pulse generator;
means for activating said pulse generator;
digital counting means responsive to said pulse generator for generating digital set point signals representative of a preselected minimum speed to which the single facer motor is to be driven, a preselected maximum speed beyond which the single facer motor is not to be driven, and first and second speeds not less than said preselected minimum speed between which the single facer motor speed is to be varied;
means for driving the single facer motor in response to at least one of said digital set point signals;
means for digitally detecting said digital set point signals representative of said preselected minimum speed and said preselected maximum speed;
digital means for inhibiting said pulse generator in response to said detecting means detecting said digital set point signal representative of said preselected minimum speed to prevent said single facer motor from being driven below said preselected minimum speed;
digital means for inhibiting said pulse generator in response to said detecting means detecting said digital set point signal representative of said preselected maximum speed to prevent said single facer motor from being driven above said preselected maximum speed;
digital means for temporarily storing said digital set point signal representative of said first speed from which said single facer motor speed is varied;
digital means for retrieving said stored set point signal; and
digital means for applying the retrieved set point signal to said driving means to restore said single facer motor speed to said first speed.

7. The system according to claim 6 including means for digitally displaying the set point speed to which the single facer motor is being driven in response to at least one of said digital set point signals.

8. The system according to claim 7 wherein said digital display means includes means for displaying said first speed while said single facer motor speed is varied therefrom, in response to said stored set point signal.

9. The system according to claim 7, wherein said activating means includes means for activating said pulse generator in synchronism with the speed of the double facer motor whereby said digital counting means generates a digital set point signal proportional to the speed of the double facer motor and wherein said driving means includes means for driving the single facer motor in response to said set point signal proportional to the double facer motor speed.

10. An improved speed control for a corrugator having at least a single facer machine operatively associated with a double facer machine, each of said machines including a motor, comprising:
digital means for automatically generating a preselected digital set point signal indicative of a preselected minimum speed for the single facer motor;
digital means for selectively generating first and second selective digital set point signals respectively indicative of first and second selective speeds for said single facer motor; and
means for bringing the speed of said single facer motor up to said preselected minimum speed in response to said preselected digital set point signal and for varying the speed of the single facer motor between said first and second selective speeds in response to said first and second selective set point signals.

11. The improved speed control according to claim 10 including digital means for automatically generating a predetermined reference set point signal indicative of a predetermined reference speed for said single facer motor, means for driving said single facer motor from an operating speed to said predetermined reference speed in response to said predetermined reference set point signal, digital means for generating and storing a digital set point signal indicative of said operating speed, and means for automatically restoring the speed of said single facer motor to said operating speed from said predetermined reference speed in response to said stored set point signal.

12. The improved speed control according to claim 11 wherein said digital means for generating said predetermined reference set point signal includes adjustable switch means for generating an adjustable reference signal representative of an adjustable reference speed for said single facer motor, preset switch means for generating a preset reference signal representative of a preset reference speed for said single facer motor, and means for selectively generating said predetermined reference set point signal in response to either of said adjustable reference and preset reference signals, whereby said predetermined reference set point signal represents one of said adjustable and preset reference speeds.

13. The system according to claim 11 including means for automatically varying the speed of said single facer motor in synchronism with the speed of the double facer motor.

14. An improved speed control for a corrugator having at least one single facer machine operatively associated with a double facer machine, each of said machines including a motor, comprising:
digital means for automatically generating a preselected digital set point signal indicative of a preselected minimum speed for the double facer machine motor;
digital means for generating first and second digital set point signals indicative of first and second speeds for said double facer machine motor, said first and second speeds being not less than said preselected minimum speed;
digital means for selectively storing said first digital set point signal while the speed of the double facer machine motor is varied;
means for automatically bringing the double facer machine motor speed up to said preselected minimum speed in response to said preselected digital set point signal and for varying the speed of the double facer machine motor between said first and second speeds in response to said first and second digital set point signals; and means for automatically restoring the double facer machine motor speed to said first speed in response to said stored digital set point signal.

15. An improved speed control for a corrugator having at least one single facer machine operatively associated with a double facer machine, each of said machines including a motor and means for driving the motor in response to set point signals representative of desired motor speeds, comprising:

digital means for automatically generating a preselected digital set point signal indicative of a preselected minimum speed for the single facer machine motor;

digital means for generating first and second digital set point signals indicative of first and second speeds for said single facer machine motor, said first and second speeds being not less than said preselected minimum speed;

digital means for selectively storing said first digital set point signal while the speed of the single facer machine motor is varied; and means for separately applying said preselected minimum speed set point signal, said first and second set point signals, and said stored set point signal to the means for driving the single facer machine motor to cause said single facer machine motor speed to reach said preselected minimum speed, vary between said first and second speeds and return to said stored first speed, respectively.

16. The improved speed control according to claim 1 including digital means for automatically generating a synchronized digital set point signal for said single facer machine motor in response to the speed of the double facer motor, and means for applying said synchronized set point signal to the means for driving the single facer machine motor to cause said single facer machine motor speed to vary in synchronism with said double facer machine motor speed.

* * * * *